(12) United States Patent
Sharon et al.

(10) Patent No.: US 10,106,097 B1
(45) Date of Patent: Oct. 23, 2018

(54) ROOF RAIL SYSTEM

(71) Applicant: Dura Operating, LLC, Auburn Hills, MI (US)

(72) Inventors: Scott Sharon, Lasalle (CA); Cumhur Unveren, Walled Lake, MI (US)

(73) Assignee: DURA OPERATING, LLC, Auburn Hills, MI (US)

( * ) Notice: Subject to any disclaimer, the term of this patent is extended or adjusted under 35 U.S.C. 154(b) by 0 days.

(21) Appl. No.: 15/695,212

(22) Filed: Sep. 5, 2017

(51) Int. Cl.
 *B60R 9/04* (2006.01)
 *B60R 9/052* (2006.01)
 *B60R 9/05* (2006.01)

(52) U.S. Cl.
 CPC ............... *B60R 9/052* (2013.01); *B60R 9/05* (2013.01)

(58) Field of Classification Search
 CPC .. B60R 9/05; B60R 9/045; B60R 9/04; B60R 9/00; B60R 9/048; B60R 9/052; B60P 7/0807
 USPC ........................................................ 224/316
 See application file for complete search history.

(56) References Cited

U.S. PATENT DOCUMENTS

| | | | |
|---|---|---|---|
| 3,519,180 A | 7/1970 | Bott | |
| 3,853,254 A * | 12/1974 | Helm | ........................ B60R 9/04 224/316 |
| 4,015,760 A | 4/1977 | Bott | |
| 4,911,349 A * | 3/1990 | Miller | ........................ B60R 9/04 224/309 |
| 7,357,284 B2 * | 4/2008 | Jauvin | ..................... A41F 9/002 224/660 |

* cited by examiner

*Primary Examiner* — Adam Waggenspack
(74) *Attorney, Agent, or Firm* — Robert E. Ford; Raymond J. Vivacqua; Steven L. Crane (57) ABSTRACT

A roof rail system for a vehicle includes a stanchion extending away from the vehicle surface. The stanchion has an exterior surface connected to leading and trailing surfaces, and an inboard surface spaced apart from the outboard surface and connected to the leading and trailing surfaces. The leading surface faces forward, the trailing surface faces rearward, the outboard surface faces outward and the inboard surface faces inward. The stanchion has a cargo attachment feature having a first and second opening connected by a first passage. One of the outboard surface and the leading surface defines the first opening, and one of the inboard surface and the trailing surface defines the second opening. A plug is disposed within the first passage and defines a second passage extending from a first flexible aperture at an outer portion of the plug to a second flexible aperture at an inner portion of the plug.

20 Claims, 6 Drawing Sheets

ROOF RAIL SYSTEM

FIELD

The present disclosure relates generally to motor vehicle roof rails, and to more particularly to roof rail tie down attachment systems and features.

BACKGROUND

The statements in this section merely provide background information related to the present disclosure and may or may not constitute prior art.

Typical roof rail systems for motor vehicles include a stanchion which connects to the vehicle roof to space a roof rail or cross bar away from the vehicle roof. Roof rail systems carry objects such as luggage, materials, recreational equipment or storage on the roof of the motor vehicle. Frequently, roof rail systems use specially designed fasteners or conventional load securing devices to attach objects to the roof rails. Stanchions and roof rails and cross bars are preferably designed aerodynamically to reduce drag and prevent noises such as whistling and buffeting while driving. Specially designed fasteners or conventional load securing devices are often not aerodynamically efficient, and can cause whistling, buffeting or other noises while driving. Thus, while current roof rail systems achieve their intended purpose, there is a need for a new and improved roof rail design with a stanchion having an integrated load securing portion with improved aerodynamic characteristics and performance.

SUMMARY

According to one aspect of the present disclosure a roof rail system for a motor vehicle includes a stanchion disposed on an exterior of the motor vehicle, the stanchion extending upwardly from the exterior, and having a leading surface connected to an outboard surface. The outboard surface is connected to a trailing surface, the trailing surface is connected to an inboard surface, the inboard surface is connected to the leading surface and is spaced apart from the exterior surface. The leading surface faces substantially toward a front of the motor vehicle, the trailing surface faces substantially toward a rear of the motor vehicle, the outboard surface faces substantially outward from the motor vehicle, and the inboard surface faces substantially inward, the stanchion having a cargo attachment feature. One of the outboard surface and the leading surface defines a first opening of the cargo attachment feature, and one of the inboard surface and the trailing surface defines a second opening of the cargo attachment feature, and the first opening and the second opening are connected by a first passage. A malleable plug is disposed within the first passage of the cargo attachment feature, the malleable plug defines a second passage, and the second passage extends from a first flexible aperture at an outer portion of the malleable plug to a second flexible aperture at an inner portion of the malleable plug.

In another aspect of the present disclosure the malleable plug is flush mounted within the stanchion and extends radially towards and forms an interference fit with the first passage of the cargo attachment feature of the stanchion.

In yet another aspect of the present disclosure an outer portion of the malleable plug is substantially flush with the outboard surface and the outer portion extends from the outboard surface to an interface, and an inner portion of the malleable plug is substantially flush with the inboard surface and extends from the inboard surface to the interface. The outer portion and the inner portion statically contact each other at the interface.

In yet another aspect of the present disclosure the interface further includes a plurality of interference fit features engaging the outer portion with the inner portion.

In yet another aspect of the present disclosure the first passage is coaxial with the second passage.

In yet another aspect of the present disclosure the first flexible aperture and the second flexible aperture further include a plurality of slits having a first width.

In yet another aspect of the present disclosure the malleable plug extends radially within the first passage and forms an interference fit with the first passage.

In yet another aspect of the present disclosure the first passage further include a plurality of retaining portions.

In yet another aspect of the present disclosure the plurality of retaining portions extend radially within the first passage of the cargo attachment features of the stanchion.

In yet another aspect of the present disclosure the malleable plug further includes a plurality of retainers for engaging with the retaining portions of the first passage of the cargo attachment feature.

In yet another aspect of the present disclosure the stanchion includes cast metal.

In yet another aspect of the present disclosure the malleable plug includes an injection molded material, and the injection molded material is resistant to degradation by solar radiation.

In yet another aspect of the present disclosure a roof rail system for a motor vehicle includes a roof rail disposed on a roof surface of a motor vehicle, a cross member, and a stanchion disposed on the roof rail and extending upwardly from the roof rail to the cross member. The stanchion is connected to the cross member, the stanchion having a leading surface connected to an outboard surface, the outboard surface is connected to a trailing surface, the trailing surface is connected to an inboard surface, the inboard surface is spaced apart from the outboard surface and connected to the leading surface. The leading surface faces substantially toward a front of the motor vehicle, the trailing surface faces substantially toward a rear of the motor vehicle, the outboard surface faces substantially outward from the motor vehicle, and the inboard surface faces substantially inward, the stanchion having a cargo attachment feature, the outboard surface defines a first opening of the cargo attachment feature, and the inboard surface defines a second opening of the cargo attachment feature. The first opening and the second opening are connected by a first passage, and a malleable plug is disposed within the first passage of the cargo attachment feature. The malleable plug defines a second passage, and the second passage extends from a first flexible aperture at an outer portion of the malleable plug to a second flexible aperture at an inner portion of the malleable plug.

In yet another aspect of the present disclosure the malleable plug further includes a first plug member extending from the first flexible aperture to an interface, and a second plug member extending from the second flexible aperture to the interface. The outer portion is flush with the outboard surface, and the inner portion is flush with the inboard surface, and the first plug member, and the second plug member engage with each other at the interface.

In yet another aspect of the present disclosure at the interface, the first plug member includes first engagement features, and the second plug member includes second engagement features.

In yet another aspect of the present disclosure the first engagement features and the second engagement features are in interlocking engagement with one another.

In yet another aspect of the present disclosure the first engagement features and the second engagement features are in interlocking engagement with third engagement features formed in the first passage of the cargo attachment feature.

In yet another aspect of the present disclosure the malleable plug extends radially towards and forms an interference fit with the first passage of the cargo attachment feature of the stanchion.

In yet another aspect of the present disclosure first flexible aperture and the second flexible aperture further include a plurality of slits having a first width.

In yet another aspect of the present disclosure a roof rail system for a motor vehicle includes a roof rail disposed on a roof surface of a motor vehicle, a cross member, and a stanchion disposed on the roof rail and extending upwardly from the roof rail to the cross member. The stanchion having a leading surface connected to an outboard surface, the outboard surface is connected to a trailing surface, the trailing surface is connected to an inboard surface, and the inboard surface is spaced apart from the outboard surface and connected to the leading surface. The leading surface faces substantially toward a front of the motor vehicle, the trailing surface faces substantially toward a rear of the motor vehicle, the outboard surface faces substantially outward from the motor vehicle, and the inboard surface faces substantially inward, the stanchion has a cargo attachment feature. The outboard surface defines a first opening of the cargo attachment feature, and the inboard surface defines a second opening of the cargo attachment feature, and the first opening and the second opening are connected by a first passage. A malleable plug disposed within the cargo attachment feature and extending from an outer portion to an inner portion with a central portion therebetween, the central portion comprises a plurality of structural pillars supporting the outer portion and the inner portion, the outer portion is flush with the outboard surface of the stanchion, and the inner portion is flush with the inboard surface of the stanchion, the malleable plug extending radially towards and forming an interference fit with the first passage of the cargo attachment feature of the stanchion. The malleable plug defines a second passage, the second passage extending from a first flexible aperture at the outer portion through the central portion to a second flexible aperture at the inner portion, and the first flexible aperture and the second flexible aperture further comprise a plurality of slits having a width.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way. In the drawings.

DETAILED DESCRIPTION

The following description is merely exemplary in nature and is not intended to limit the present disclosure, application, or uses.

Referring to FIGS. 1-4, an example of a roof rail system according to the present disclosure is shown and generally indicated by reference number 10. The roof rail system is preferably used with a motor vehicle 12, for example a passenger vehicle, truck, sport utility vehicle, van, motor home, or any other type of vehicle without departing from the scope of the present disclosure. The roof rail system 10 generally includes a plurality of stanchions 14 and a cross bar 15. For simplicity, in the description that follows while only a single stanchion 14 is described in detail, it should be understood that the roof rail system 10 includes at least two stanchions 14 disposed on the motor vehicle 12 to support a roof rail and/or cross bar. For example, the at least two stanchions 14 may be disposed on left and right-hand sides of the motor vehicle 12 with the cross bar 15 disposed between the two stanchions. In another example, the at least two stanchions 14 may be disposed on front and rear sides of the motor vehicle 12 with a longitudinally oriented roof rail 17 disposed between the two stanchions 14.

In one aspect, the stanchion 14 is a cast metal product having a roof rail attachment portion 16 and a cross bar attachment portion 18. The stanchion 14 extends outwardly from a roof surface 20 of the motor vehicle 12 from the roof rail attachment portion 16 to the cross bar attachment portion 18 with a central portion 22 disposed therebetween. The roof rail attachment portion 16 is mounted to the motor vehicle 12 using attachment points 23 provided on the motor vehicle 12. In one aspect, the roof rail attachment portion 16 may be mounted to the motor vehicle 12 by a variety of different attachment mechanisms including: adhesives, welds, mechanical fasteners, such as screws, bolts, clips, rivets and the like. In some aspects, the roof rail attachment portion 16 may be slidably mounted and in locking engagement with a portion of the roof surface 20 of the motor vehicle 12. In one aspect, the cross bar attachment portion 18 is attached to the cross bar 15 by a variety of different attachment features (not shown) including: welds, mechanical fasteners such as screws, bolts, clips, rivets, and the like. In some aspects, the cross bar 15 may be slidably mounted in a locking interface with the cross bar attachment portion 18 of the stanchion 14.

The central portion 22 has an outboard surface 24, a leading surface 26, a trailing surface 28, and an inboard surface 30. The outboard surface 24 extends from the roof surface 20 of the motor vehicle 12 to the cross bar attachment portion 18 and forms an exterior aspect of the central portion 22 of the stanchion 14. In one aspect, the outboard surface 24 of the central portion 22 of the stanchion 14 is oriented to face outward relative to a longitudinal axis of the motor vehicle 12. The outboard surface 24 is designed to be aesthetically pleasing to operators of the motor vehicle 12, and has a generally smooth, curvilinear shape. The outboard surface 24 also extends from the leading surface 26 to the trailing surface 28 of the central portion 22 of the stanchion 14.

The leading surface 26 forms the forward-most surface of the central portion 22 of the stanchion 14. The leading surface 26 extends from the roof surface 20 of the motor vehicle 12 to the cross bar attachment portion 18, and is aerodynamically designed. In several aspects, the leading surface 26 is aerodynamically optimized to minimize aerodynamic drag, turbulence, wind noise and the like. The leading surface 26 defines a first width "$W_1$" between the outboard surface 24 and the inboard surface 30. In one aspect, the first width "$W_1$" of the leading surface 26 is variable. For example, the first width "$W_1$" may be greater near the roof surface 20 of the motor vehicle 12 than at the cross bar attachment portion 18. The leading surface 26 is designed to be aesthetically pleasing to operators of the motor vehicle 12, and has a generally smooth, curvilinear shape.

The trailing surface 28 forms the rearward-most surface of the central portion 22 of the stanchion 14. The trailing surface 28 extends from the roof surface 20 of the motor vehicle 12 to the cross bar attachment portion 18, and is aerodynamically designed. The trailing surface 28 defines a second width "$W_2$" between the outboard surface 24 and the inboard surface 30. In one aspect, the second width "$W_2$" of the trailing surface 28 is variable. For example, the second width "$W_2$" may be greater near the roof surface 20 of the motor vehicle 12 than at the cross bar attachment portion 18. Furthermore, the second width "$W_2$" may be the same as or smaller than the first width "$W_1$" of the leading surface 26. When the second width "$W_2$" is smaller than the first width "$W_1$", the central portion 22 of the stanchion 14 has a cross section that tapers near the leading surface 26 and the trailing surface 28. In several aspects, the trailing surface 28 is aerodynamically optimized to minimize aerodynamic drag, turbulence, vortices, wind noise, and the like. The trailing surface 28 is also designed to be aesthetically pleasing to operators of the motor vehicle 12, and has a generally smooth, curvilinear shape.

The inboard surface 30 extends from the roof surface 20 of the motor vehicle 12 to the cross bar attachment portion 18 and forms an interior aspect of the central portion 22 of the stanchion 14. In one aspect, the inboard surface 30 of the central portion 22 of the stanchion 14 is oriented to face inward toward the longitudinal axis of the motor vehicle 12. That is, the inboard surface 30 is disposed opposite the outboard surface 24 of the central portion 22. The inboard surface 30 is aerodynamically optimized to minimize aerodynamic drag, turbulence, vortices, wind noise, and the like.

The inboard surface 30 has a generally smooth, curvilinear shape. The inboard surface 30 also extends from the leading surface 26 to the trailing surface 28 of the central portion 22 of the stanchion 14.

A load securing portion 32 is integrally formed in the central portion 22 of the stanchion 14. The load securing portion 32 is positioned behind the leading surface 26 and is a smooth, substantially curvilinear first passage extending through the stanchion 14 from the outboard surface 24 to the inboard surface 30. The load securing portion 32 is sized according to the motor vehicle 12 on which the roof rail system 10 is equipped. For example, the load carrying capacity, by weight, of the roof rail system 10 for a small hatchback may be substantially lower than the load carrying capacity of a large sport-utility vehicle, truck, or the like. The smooth, substantially curvilinear first passage of the load securing portion 32 is adapted to receive and support a fastener 34, such as a rope, cable, bungee, hook, clip, or the like. Because the load securing portion 32 defines the first passage through the stanchion 14, when the motor vehicle 12 is in motion, there is a potential for the load securing portion 32 to create aerodynamic drag, turbulence, vortices, wind noise, and the like.

The central portion 22 of the stanchion 14 further includes a plug 36 sized to fit into and substantially fill the load securing portion 32. In several aspects, the plug 36 is an injection-molded part composed of a UV-degradation resistant, at least partially flexible, resilient material such as polyurethane, rubber, EPDM, or the like. The flexible resilient nature of the plug material allows the plug 36 to be inserted into the load securing portion 32 after the stanchion 14 has been formed, during assembly of the roof rail system 10. The plug 36 engages with the load securing portion 32 of the stanchion 14 via an interference fit or retaining portions on the plug 36 and corresponding interference fitting or retaining portions within the load securing portion 32. In some aspects, the plug 36 is permanently affixed to load securing portion 32 of the stanchion 14 after assembly. However, it should be appreciated that because the plug 36 is composed of a flexible material the plug 36 may be replaceable. That is, depending on the application for which the plug 36 is being used, and more specifically, depending on the load carrying capacity of the roof rail system 10, the durometer of the material of which the plug 36 is composed may be variable, and the plug 36 may be replaceable by either a trained mechanic, or by an average user of the motor vehicle. Furthermore, and as shown in FIGS. 2-6B, once the plug 36 has been inserted into the load securing portion 32, an exterior surface 38 of the plug 36 is substantially flush with the outboard surface 24 of the stanchion 14, and similarly an interior surface 40 of the plug 36 is substantially flush with the inboard surface 30 of the stanchion 14. However, if the plug 36 were to fully fill the load securing portion 32 of the stanchion 14, the utility of the roof rail system 10 would be decreased.

With continuing reference to FIGS. 1-4, and with additional reference to FIGS. 5A-7A to improve the utility of the roof rail system 10 while maintaining desirable aerodynamic drag, turbulence, wind noise, etc. characteristics, the exterior and interior surfaces 38, 40 of the plug 36 define apertures 42 connected by a second passage or central bore 44. The second passage or central bore 44 is concentric with and coaxially located within the first passage and extends substantially from the aperture 42 at the exterior surface 38 to the aperture 42 at the interior surface 40. The apertures 42 of the exterior and interior surfaces 38, 40 are optimally sized to receive the fastener 34 while providing the outboard and inboard surfaces 24, 30 of the stanchion 14 with a substantially smooth, curvilinear shape. That is, while the exterior and interior surfaces 38, 40 are interrupted by apertures 42, the apertures 42 are optimally shaped to maintain the substantially smooth curvilinear shape of the outboard and inboard surfaces 24, 30 of the stanchion 14. In several aspects, and as shown in FIGS. 2-5A, 6A, and 7A-B, the apertures 42 are a plurality of connected slits 46 arranged in an X-shape. The slits 46 define a plurality of substantially triangular flaps 48. Thus, when no fastener 34 is present, the substantially triangular flaps 48 of the exterior and interior surfaces 38, 40 of the plug 36 maintain a smooth curvilinear surface that is substantially continuous with the respective outboard and inboard surfaces 24, 30 of the stanchion 14. However, as a fastener 34 such as a rope is inserted into the aperture 42 of the exterior surface 38 of the plug 36, the resilient nature of the material of the plug 36 allows the triangular flaps 48 to temporarily deform, thereby allowing access to for the fastener 34 to traverse the second passage or central bore 44 and exit via the aperture 42 of the interior surface 40 of the plug 36. For example, to allow access for a typical rope fastener 34 having a cross-sectional diameter of 13 mm, for retaining an approximately 2000N load, the slits 46 of the apertures 42 have a third width "$W_3$" of approximately 1 mm and extend for up to approximately 30 mm. That is, in the example, each of the substantially triangular flaps 48 forms an isosceles triangle whose equal sides measure approximately 15 mm each, and each substantially triangular flap 48 is separated from the adjacent substantially triangular flaps 48 by a slit 46 having a third width "$W_3$" of approximately 1 mm. It should be understood that while the apertures 42 have been described as being formed of a series of connected slits 46 in an X-shape, the apertures 42 may also take a variety of other forms, such as holes having substantially circular, ovoid, oblong, square shapes, etc., or a plurality thereof. Moreover, the third widths "$W_3$" of the slits 46 forming the apertures 42 may vary without departing from the scope or intent of the present disclosure.

Figure 1:
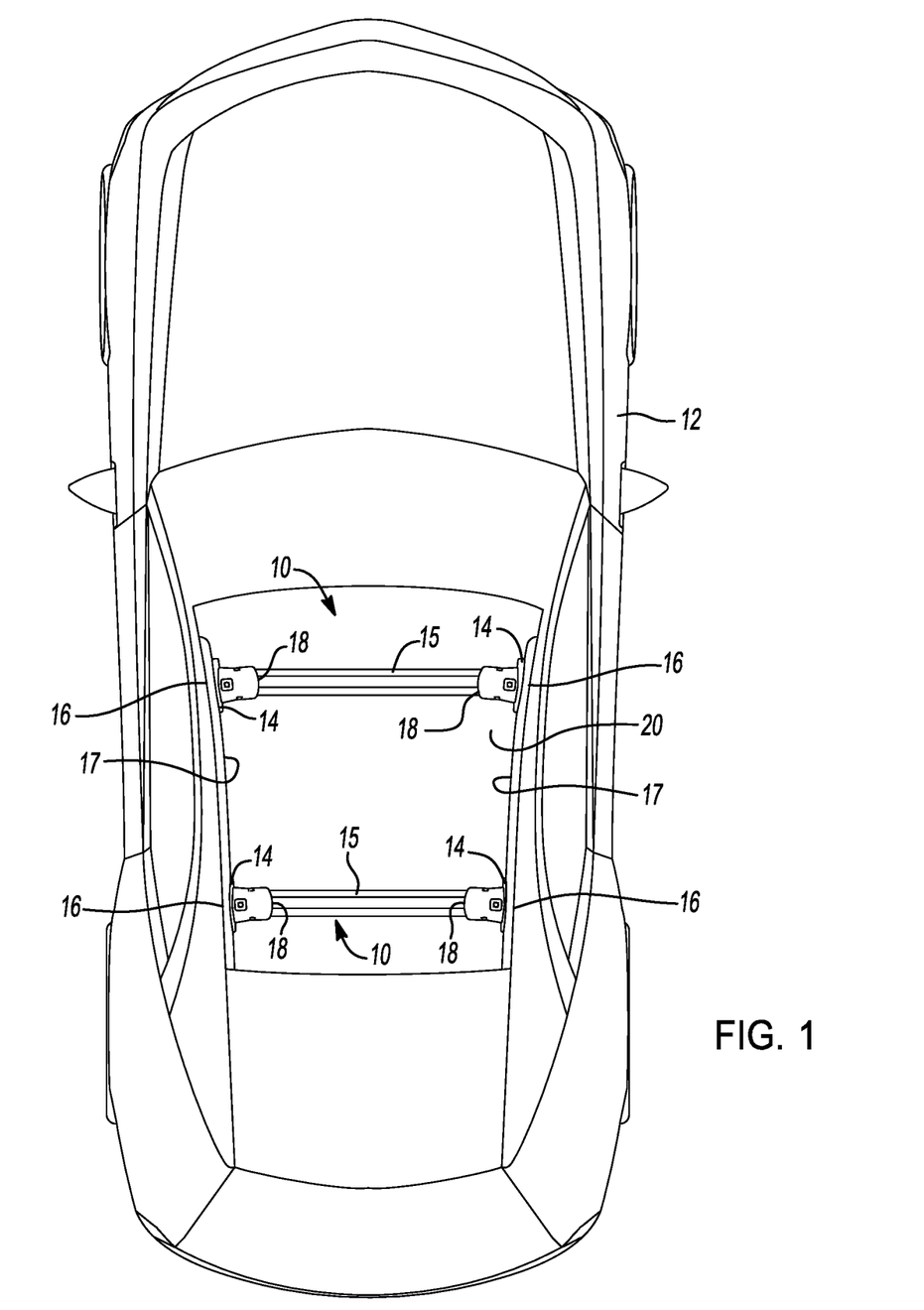
FIG. 1 is an exterior top view of a motor vehicle equipped with a roof rail system according to an aspect of the present disclosure.
Figure 2:
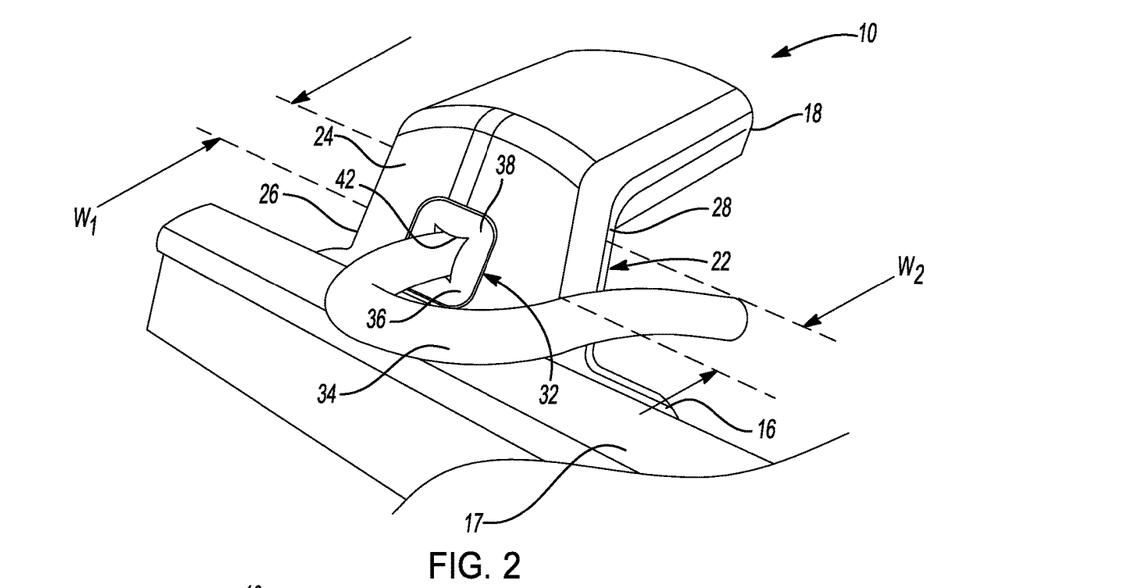
FIG. 2 is an exterior perspective view of a roof rail system for a motor vehicle according to an aspect of the present disclosure.
Figure 3:
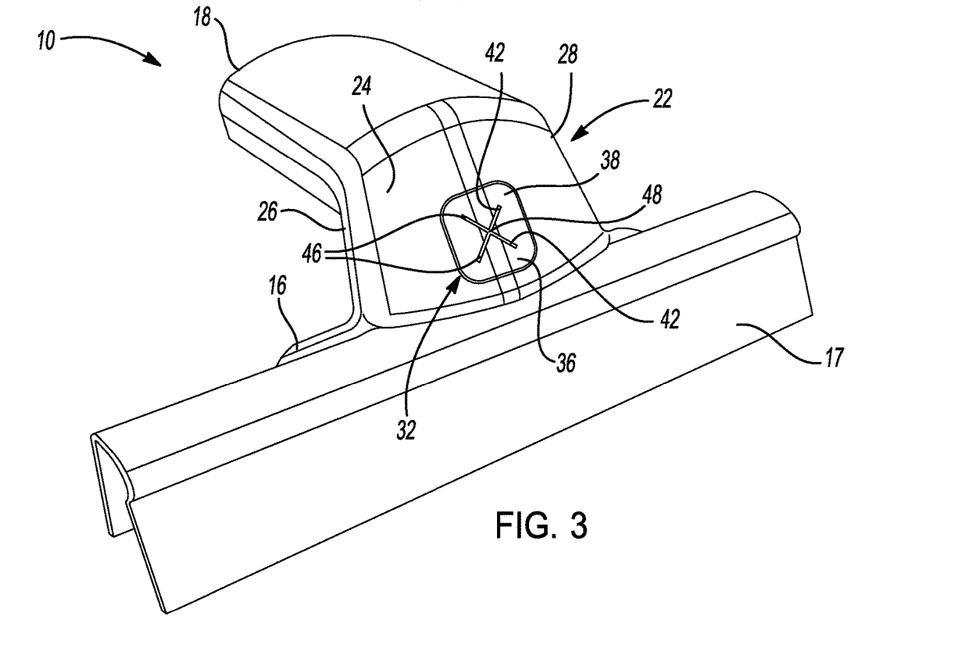
FIG. 3 is an exterior perspective view of a portion of the roof rail system according to another aspect of the present disclosure.
Figure 4:
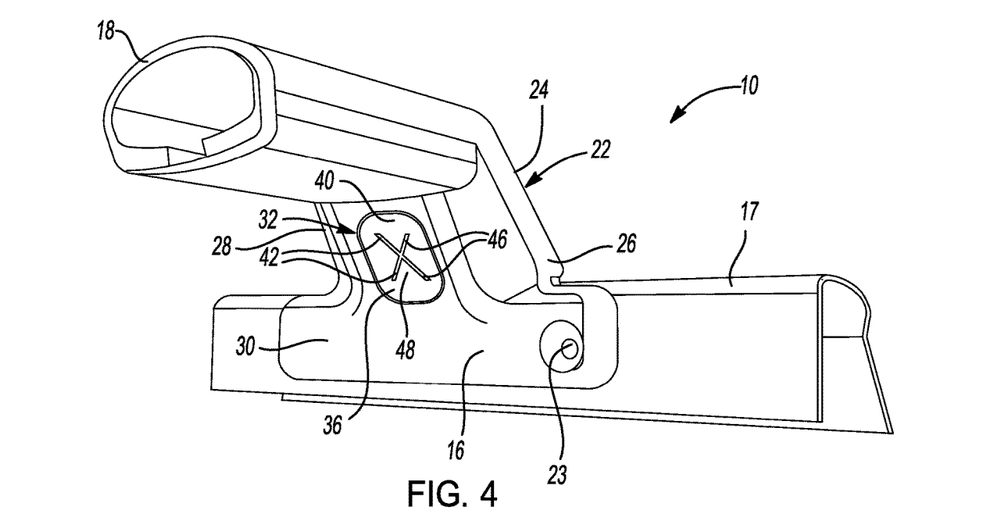
FIG. 4 is an interior perspective view of a portion of the roof rail system according to an aspect of the present disclosure.
Figure 5A:
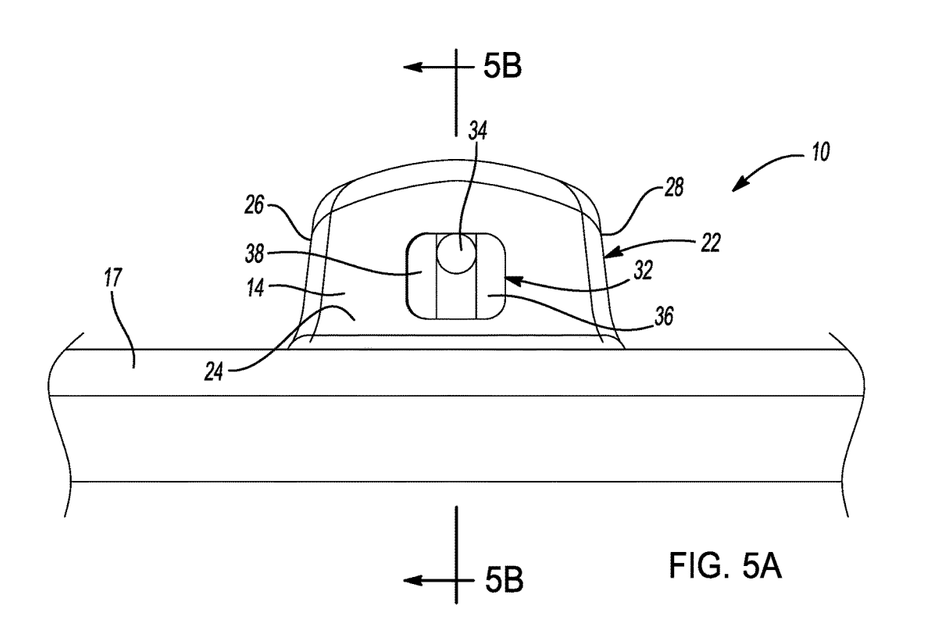
FIG. 5A is an exterior side view of a portion of the roof rail system according to an aspect of the present disclosure.
Figure 5B:
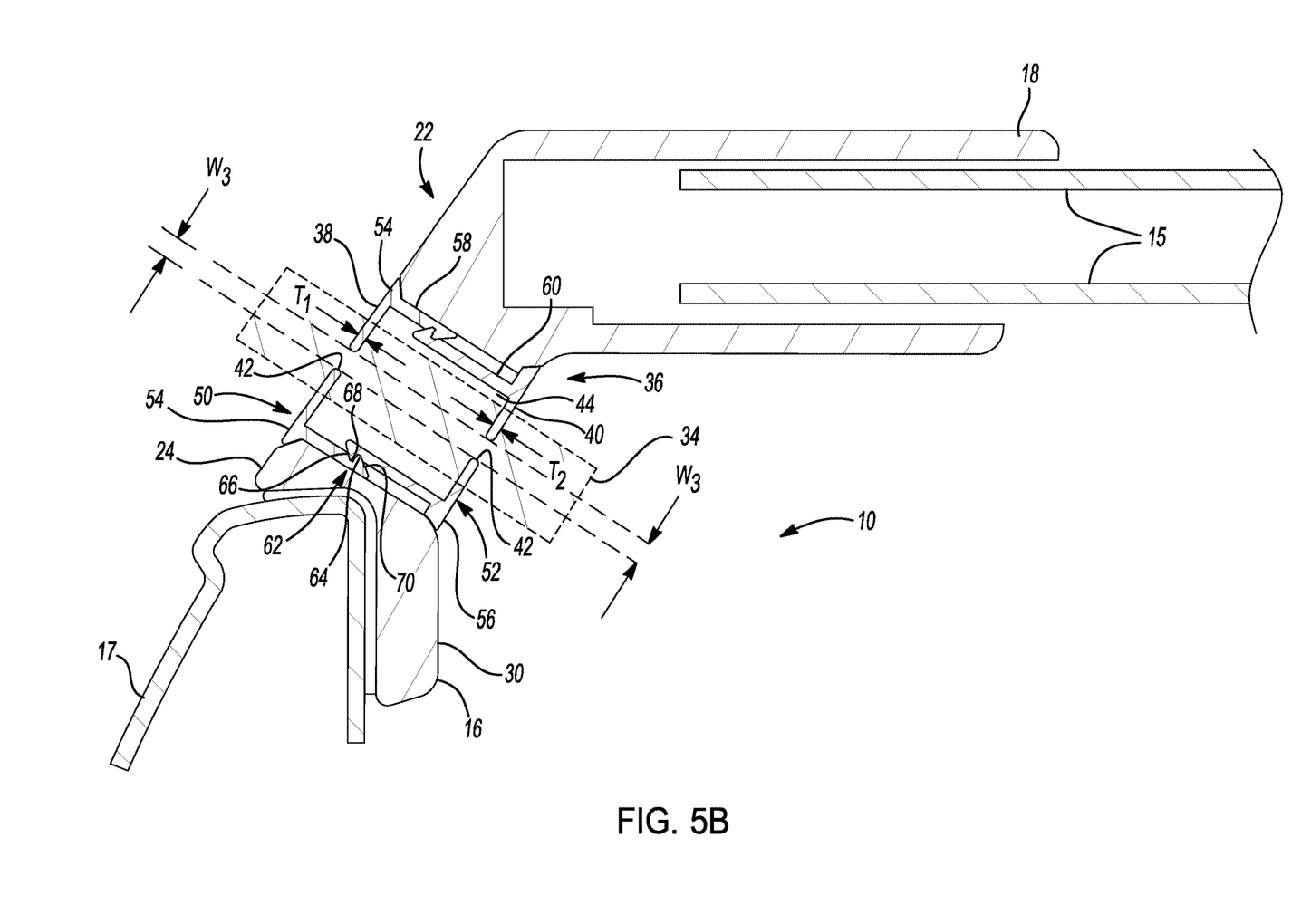
FIG. 5B is a cross sectional view of the roof rail system of FIG. 5A taken along line 5B-5B according to an aspect of the present disclosure.
Figure 6A:
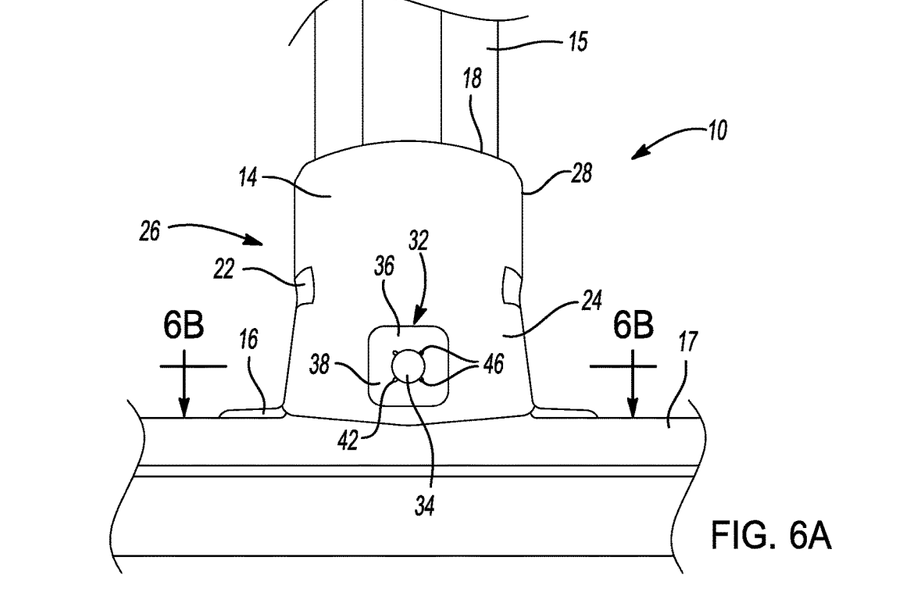
FIG. 6A is an exterior top perspective rear view of a portion of the roof rail system according to an aspect of the present disclosure.
Figure 6B:
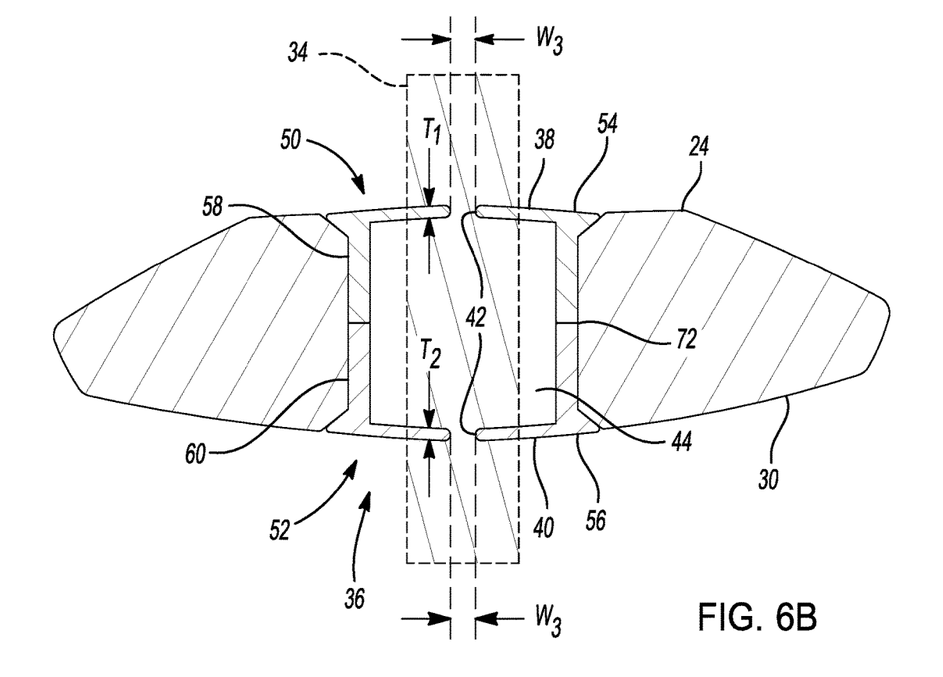
FIG. 6B is a cross sectional view of the roof rail system of FIG. 6A taken along line 6B-6B according to an aspect of the present disclosure.

The plug 36 of the roof rail system 10 may take several different shapes, sizes, and constructions, including single components and multiple component forms. For example, in FIGS. 5B and 6B, the plug 36 is composed of two component parts: an outer portion or member 50 and an inner portion or member 52. The outer portion 50 is formed with an exterior flange 54 that forms the exterior surface 38 of the plug 36, and the inner portion 52 is formed with an interior flange 56 that forms the interior surface 40 of the plug 36. The exterior flange 54 has a first thickness "$T_1$", and the interior flange 56 has a second thickness "$T_2$". In one aspect, the first and second thicknesses "$T_1$", "$T_2$" are equal to one another, and measure approximately 5 mm. In another example, the first and second thicknesses "$T_1$", "$T_2$" differ from one another, and the first and second thicknesses "$T_1$", "$T_2$" equal or exceed 5 mm. That is, the thicknesses "$T_1$", "$T_2$", of the exterior and interior flanges 54, 56 may vary depending on the application, and the dimensions of the fasteners 34 intended for use with the roof rail system 10. The outer portion 50 is continuously molded with a first inserted section 58, and the inner portion 52 is continuously molded with a second inserted section 60. The first and second inserted sections 58, 60 are optimally sized and shaped to be firmly inserted into the load securing portion 32 of the stanchion 14, such that the outer and inner portions 50, 52 of the plug 36 are immovably secured relative to the stanchion 14 once each has been inserted. In other words, once the plug 36 has been inserted into the load securing portion 32, the plug 36 is substantially fixed in place both axially, relative to the first passage of the load securing portion 32, and rotationally. In one aspect, the outer and inner portions 50, 52 of the plug include first engagement features 62, such as beveled edges, interference fittings, and the like. For example, the embodiment of FIG. 5B depicts the outer portion 50 of the plug 36 having a first beveled section 64, and a first retainer 66 for engaging with and preventing motion of a second beveled section 68 and second retainer 70 of the inner portion 52 of the plug 36. However, as can be seen in FIG. 6B, the outer and inner portions 50, 52, may also merely abut one another at an interface 72. Thus, it should be understood that depending on the application for which the roof rail system 10 is intended, the outer and inner portions 50, 52 of the plug 36 may abut each other, engage with and interlock with each other, or engage with and interlock with second engagement features (not shown) formed within the first passage of the load securing portion 32 itself, or both, without departing from the scope or intent of the present disclosure.

Figures 7A, 7B:
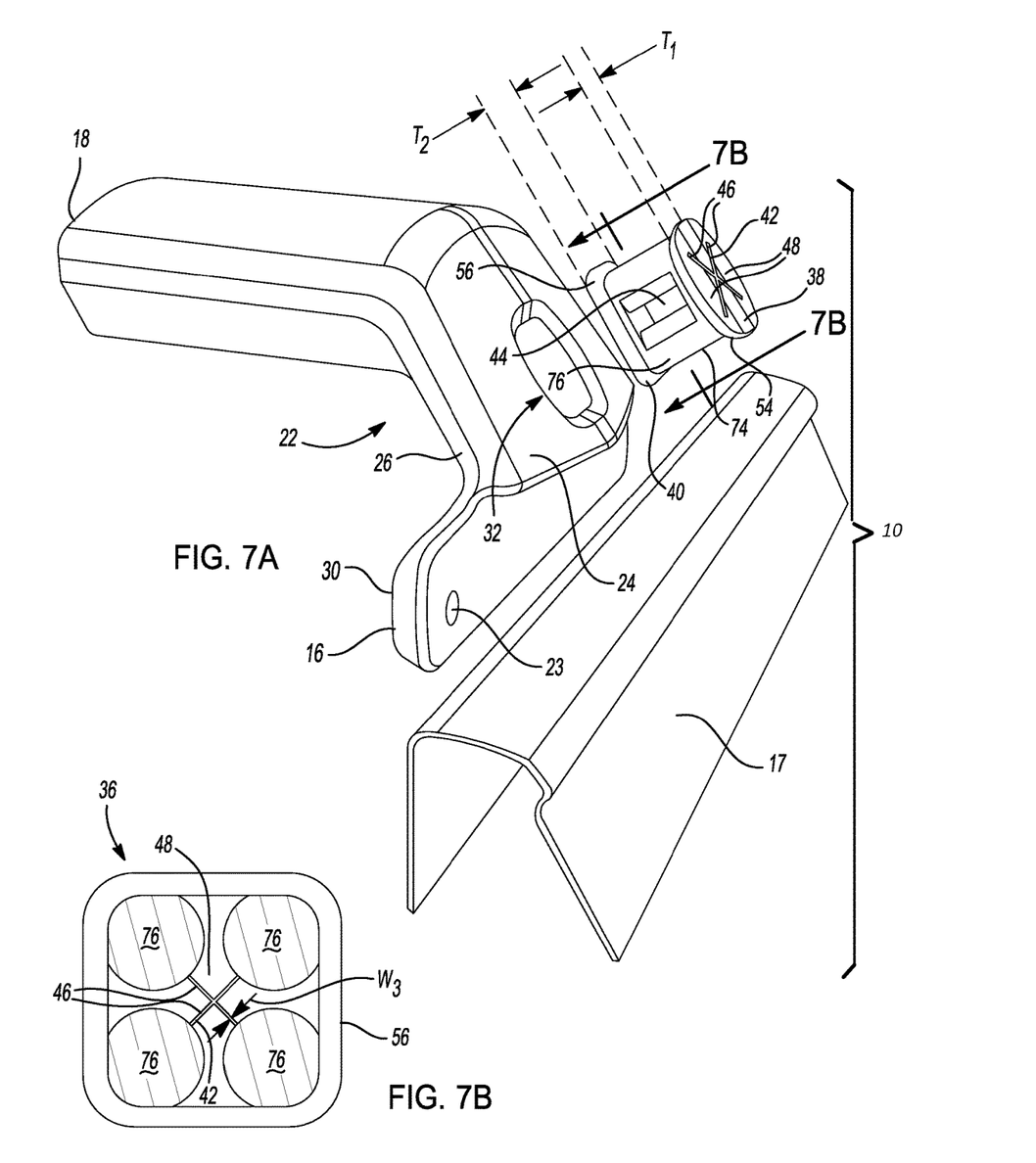
FIG. 7A is an exploded exterior perspective view of a roof rail system according to an aspect of the present disclosure.
FIG. 7B is a cross sectional view of a plug of the roof rail system of FIG. 7A taken along line 7B-7B according to an aspect of the present disclosure.

In the example of FIGS. 7A-7B, the plug 36 is composed of an injection-molded component having a unitary construction. The plug 36, when inserted into the stanchion 14, extends from the exterior flange 54 at the outboard surface 24 of the stanchion 14 to the interior flange 56 at the inboard surface 30 of the stanchion 14 with a third inserted section 74 disposed therebetween. Because the plug 36 of FIGS. 7A-B is unitary in construction, inserting the plug 36 into the load securing portion 32 of the stanchion 14 requires that at least a portion of the plug 36 be deformable, as the first passage of the load securing portion 32 is smaller than the exterior and interior flanges 54, 56 of the plug 36. To facilitate the insertion of the plug 36, and because the exterior and interior flanges 54, 56 perform the retaining, engaging, and locking functions previously discussed with respect to the first and second engagement features (62, not shown), the third inserted section 74 may be substantially less robust in construction and composition than the outer and inner portions 50, 52 of FIGS. 5A-6B. In one aspect, and as depicted in FIGS. 7A-7B the third inserted section 74 is molded in the form of four pillars 76 surrounding the second passage or central bore 44. Depending on the internal shape, size, and load requirements of the first passage of the load securing portion 32, the pillars 76 may vary. For example, the pillars 76 may in some instances be more accurately described as two parallel plates (not shown) shaped to align with and contact a front side (not shown) and a back side (not shown) of the first passage of the load securing portion 32. In another example, the pillars 76 may describe the edges of a prism having a triangular, quadrilateral, pentagonal, hexagonal, etc. structure, or any number of other substantially prismatic, columnar structures. Furthermore, each of the pillars 76 may include engagement features (not shown) for engaging with and interlocking with second engagement features (not shown) formed within the first passage of the load securing portion 32 itself without departing from the scope or intent of the present disclosure.

Finally, it should be understood that while the load securing portion 32 has been described as being located within the stanchion 14 of the roof rail system 10, it may be located elsewhere in the roof rail system 10. For example, the load securing portion 32 may be disposed within the cross bar 15, or in the longitudinally oriented roof rail 17 without departing from the scope or intent of the present disclosure.

The roof rail system 10 of the present disclosure offers several advantages. These include ease of manufacture, low cost, and replaceability, as well as ease of access for operators of the motor vehicle 12, while providing improved aerodynamics, noise, vibration, and harshness characteristics, and in particular, improved wind noise characteristics.

The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:

1. A roof rail system for a motor vehicle, the system comprising:
    a stanchion disposed on an exterior of the motor vehicle, the stanchion extending upwardly from the exterior, and having a leading surface connected to an outboard surface, the outboard surface is connected to a trailing surface, the trailing surface is connected to an inboard surface, the inboard surface is connected to the leading surface and is spaced apart from the exterior surface, the leading surface faces substantially toward a front of the motor vehicle, the trailing surface faces substantially toward a rear of the motor vehicle, the outboard surface faces substantially outward from the motor vehicle, and the inboard surface faces substantially inward, the stanchion having a cargo attachment feature, wherein one of the outboard surface and the leading surface defines a first opening of the cargo attachment feature, and one of the inboard surface and the trailing surface defines a second opening of the cargo attachment feature, and the first opening and the second opening are connected by a first passage; and
    a malleable plug disposed within the first passage of the cargo attachment feature, the malleable plug defines a second passage, and the second passage extends from a first flexible aperture at an outer portion of the malleable plug to a second flexible aperture at an inner portion of the malleable plug.

2. The roof rail system of claim 1 wherein the malleable plug is flush mounted within the stanchion and extends radially towards and forms an interference fit with the first passage of the cargo attachment feature of the stanchion.

3. The roof rail system of claim 1 wherein an outer portion of the malleable plug is substantially flush with the outboard surface and the outer portion extends from the outboard surface to an interface, and an inner portion of the malleable plug is substantially flush with the inboard surface and extends from the inboard surface to the interface, and wherein the outer portion and the inner portion statically contact each other at the interface.

4. The roof rail system of claim 3 wherein the interface further comprises a plurality of interference fit features engaging the outer portion with the inner portion.

5. The roof rail system of claim 1 wherein the first passage is coaxial with the second passage.

6. The roof rail system of claim 1 wherein the first flexible aperture and the second flexible aperture further comprise a plurality of slits having a first width.

7. The roof rail system of claim 1 wherein the malleable plug extends radially within the first passage and forms an interference fit with the first passage.

8. The roof rail system of claim 1 wherein the first passage further comprises a plurality of retaining portions.

9. The roof rail system of claim 8 wherein the plurality of retaining portions extend radially within the first passage of the cargo attachment features of the stanchion.

10. The roof rail system of claim 8 wherein the malleable plug further comprises a plurality of retainers for engaging with the retaining portions of the first passage of the cargo attachment feature.

11. The roof rail system of claim 1 wherein the stanchion comprises cast metal.

12. The roof rail system of claim 1 wherein the malleable plug comprises an injection molded material, and the injection molded material is resistant to degradation by solar radiation.

13. A roof rail system for a motor vehicle, the system comprising:
    a roof rail disposed on a roof surface of a motor vehicle;
    a cross member;
    a stanchion disposed on the roof rail and extending upwardly from the roof rail to the cross member, the stanchion connected to the cross member, the stanchion having a leading surface connected to an outboard surface, the outboard surface is connected to a trailing surface, the trailing surface is connected to an inboard surface, the inboard surface is spaced apart from the outboard surface and connected to the leading surface, the leading surface faces substantially toward a front of the motor vehicle, the trailing surface faces substantially toward a rear of the motor vehicle, the outboard surface faces substantially outward from the motor vehicle, and the inboard surface faces substantially inward, the stanchion having a cargo attachment feature, the outboard surface defines a first opening of the cargo attachment feature, and the inboard surface defines a second opening of the cargo attachment feature, and wherein the first opening and the second opening are connected by a first passage; and
    a malleable plug is disposed within the first passage of the cargo attachment feature, the malleable plug defines a second passage, and the second passage extends from a first flexible aperture at an outer portion of the malleable plug to a second flexible aperture at an inner portion of the malleable plug.

14. The roof rail system of claim 13 wherein the malleable plug further comprises a first plug member extending from the first flexible aperture to an interface, and a second plug member extending from the second flexible aperture to the interface, wherein the outer portion is flush with the outboard surface, and the inner portion is flush with the inboard surface, and wherein the first plug member, and the second plug member engage with each other at the interface.

15. The roof rail system of claim 14 wherein at the interface, the first plug member includes first engagement features, and the second plug member includes second engagement features.

16. The roof rail system of claim 14 wherein the first engagement features and the second engagement features are in interlocking engagement with one another.

17. The roof rail system of claim 14 wherein the first engagement features and the second engagement features are in interlocking engagement with third engagement features formed in the first passage of the cargo attachment feature.

18. The roof rail system of claim 14 wherein the malleable plug extends radially towards and forms an interference fit with the first passage of the cargo attachment feature of the stanchion.

19. The roof rail system of claim 13 wherein the first flexible aperture and the second flexible aperture further comprise a plurality of slits having a first width.

20. A roof rail system for a motor vehicle, the system comprising:
a roof rail disposed on a roof surface of a motor vehicle;
a cross member;
a stanchion disposed on the roof rail and extending upwardly from the roof rail to the cross member, the stanchion having a leading surface connected to an outboard surface, the outboard surface is connected to a trailing surface, the trailing surface is connected to an inboard surface, the inboard surface is spaced apart from the outboard surface and connected to the leading surface, the leading surface faces substantially toward a front of the motor vehicle, the trailing surface faces substantially toward a rear of the motor vehicle, the outboard surface faces substantially outward from the motor vehicle, and the inboard surface faces substantially inward, the stanchion has a cargo attachment feature, and the outboard surface defines a first opening of the cargo attachment feature, and the inboard surface defines a second opening of the cargo attachment feature, and wherein the first opening and the second opening are connected by a first passage;
a malleable plug disposed within the cargo attachment feature and extending from an outer portion to an inner portion with a central portion therebetween, the central portion comprises a plurality of structural pillars supporting the outer portion and the inner portion, the outer portion is flush with the outboard surface of the stanchion, and the inner portion is flush with the inboard surface of the stanchion, the malleable plug extending radially towards and forming an interference fit with the first passage of the cargo attachment feature of the stanchion, and the malleable plug defines a second passage, the second passage extending from a first flexible aperture at the outer portion through the central portion to a second flexible aperture at the inner portion, and wherein the first flexible aperture and the second flexible aperture further comprise a plurality of slits having a width.

* * * * *